United States Patent
Steffen

(10) Patent No.: US 8,689,738 B2
(45) Date of Patent: Apr. 8, 2014

(54) **VEGETARIAN FEEDING METHOD FOR CARNIVOROUS FISH AND SHRIMP WITH *SPIRULINA* AND *CHLORELLA* ALGAE USING ELECTROLYZED WATER AND SODIUM THIOSULFATE, GUAR AND OLIGOFRUCTANS AS ADDITIVES**

(76) Inventor: Hanspeter Steffen, Alchenstorf (CH)

( * ) Notice: Subject to any disclaimer, the term of this patent is extended or adjusted under 35 U.S.C. 154(b) by 0 days.

(21) Appl. No.: 13/983,647

(22) PCT Filed: Feb. 3, 2012

(86) PCT No.: PCT/CH2012/000029
§ 371 (c)(1),
(2), (4) Date: Aug. 5, 2013

(87) PCT Pub. No.: WO2012/103662
PCT Pub. Date: Aug. 9, 2012

(65) Prior Publication Data
US 2013/0312669 A1     Nov. 28, 2013

(30) Foreign Application Priority Data

Feb. 5, 2011  (CH) ........................................ 213/11

(51) Int. Cl.
*A01K 61/00*         (2006.01)
(52) U.S. Cl.
USPC ................ 119/212; 119/230; 426/2; 426/805
(58) Field of Classification Search
USPC .............. 119/212, 230, 231, 215, 242; 426/2, 426/805
See application file for complete search history.

(56) References Cited

U.S. PATENT DOCUMENTS

| | | | | |
|---|---|---|---|---|
| 3,891,535 A | * | 6/1975 | Wikey ......................... | 204/278.5 |
| 5,128,153 A | * | 7/1992 | Axelrod ............................ | 426/2 |
| 5,715,774 A | * | 2/1998 | Adey et al. .................... | 119/230 |
| 5,733,539 A | * | 3/1998 | Kitano et al. ................... | 424/84 |
| 7,067,145 B2 | * | 6/2006 | Place et al. ..................... | 424/439 |
| 7,396,548 B2 | * | 7/2008 | Kyle ................................. | 426/2 |

FOREIGN PATENT DOCUMENTS

| | | |
|---|---|---|
| EP | 1 332 759 | 8/2003 |
| WO | WO 01/22834 | 4/2001 |

OTHER PUBLICATIONS

International Search Report mailed Jul. 3, 2012 in corresponding PCT International Application No. PCT/CH2012/000029.
Milko A. Jorquera et al., "Disinfection of seawater for hatchery aquaculture systems using electrolytic water treatment," Aquaculture, vol. 207, No. 3-4, pp. 213-224, May 1, 2002.
Jun-ichi Nakazoe et al., "Effects of the Supplementation of Algae or Lipids to the Diets on the Growth and Body Composition of Nibbler *Girella punctata* Gray," Bulletin of the Tokai Region Fisheries Research, vol. 12, pp. 43-51, 1986 (Abstract only, with English translation).

* cited by examiner

*Primary Examiner* — Yvonne Abbott
(74) *Attorney, Agent, or Firm* — Ostrolenk Faber LLP

(57) ABSTRACT

Feeding method and production technology of a vegetarian feed for carnivorous fish prepared from *Spirulina* and *Chlorella* algae that are produced by cell proliferation in production tanks in electrolyzed water with chlorine-neutralizing sodium thiosulfate and are subsequently dried, pelleted and packaged. The fish feed can be employed without the fish having diarrhea. As a result, the water in fish breeding tanks does not become immoderately eutrophic and at the same time the daily weight gain of the fish is not affected. An optimum daily growth rate and a fish flesh quality can be achieved without the use of animal and fish-based proteins in the fish food ration. The fish food is also inexpensive and ecologically sustainable and ethically acceptable, since it contributes to the rescue of the remaining fish stocks in waters worldwide.

16 Claims, 1 Drawing Sheet

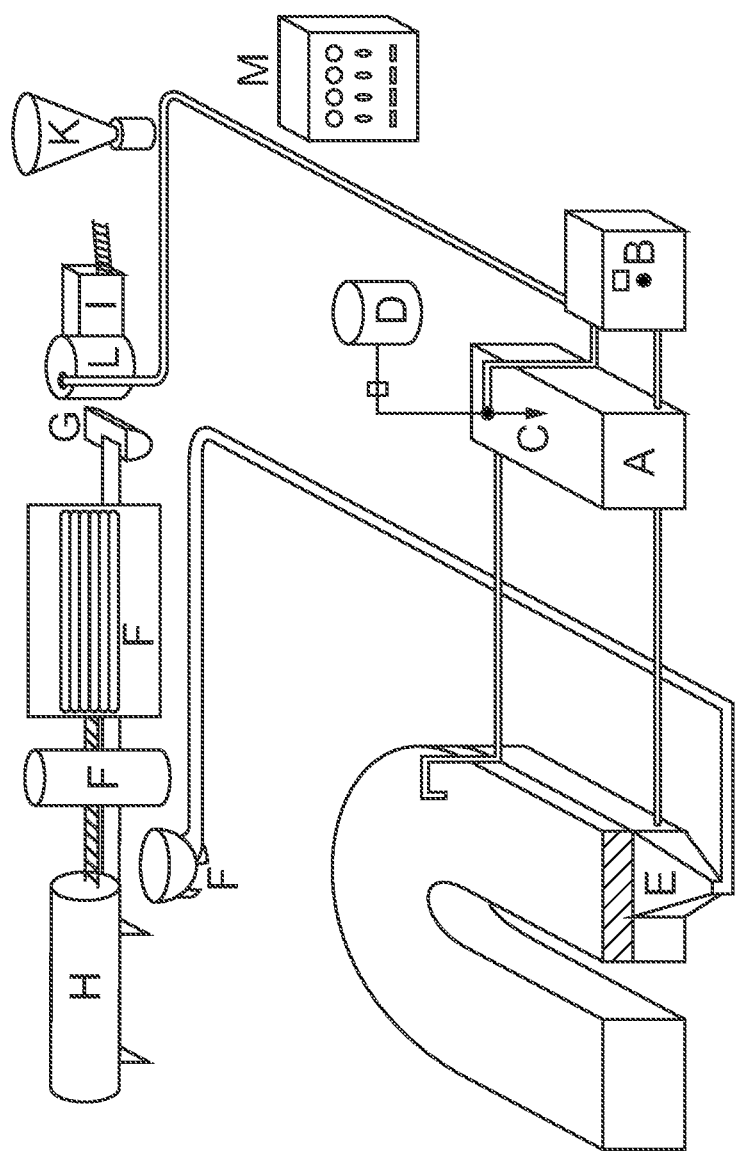

VEGETARIAN FEEDING METHOD FOR CARNIVOROUS FISH AND SHRIMP WITH *SPIRULINA* AND *CHLORELLA* ALGAE USING ELECTROLYZED WATER AND SODIUM THIOSULFATE, GUAR AND OLIGOFRUCTANS AS ADDITIVES

CROSS-REFERENCE TO RELATED APPLICATIONS

The present application is a 35 U.S.C. §§371 national phase conversion of PCT/CH2012/000029, filed Feb. 3, 2012, which claims priority to Switzerland Patent Application No. 213/11, filed Feb. 5, 2011, the contents of both of which are incorporated herein by reference. The PCT International Application was published in the German language.

TECHNICAL FIELD

The invention relates to a novel method for the preparation of a fully vegetarian feed for growing and fattening carnivorous fish, shrimp and other aquatic animals, without the use of animal by-products and fish meal in the feed ration, on a purely vegetarian base using *Spirulina* and *Chlorella* algae which are produced by means of electrolyzed water with addition of chlorine-neutralizing sodium thiosulfate and which, as feed pellets which are treated with guar and oligofructans, can be administered as a complete feed.

PRIOR ART

It has not been possible to date to feed carnivorous fish and shrimp and other aquatic animals, such as trout and salmon and the like, on a purely vegetarian base since the purely vegetarian nutrition causes them to suffer from digestive problems and diarrhea, whereby their health is adversely effected, and, accordingly, the weight gains are modest.

SUMMARY OF THE INVENTION

Introduction

Aquaculture first peaked in 2009. More than 50% of fish and fish products consumed by man originated from farms, fed artificially with feeds consisting to more than 60% of fish meal. Thus, the aquaculture industry produced more fish and marine products than were openly caught in seas, lakes and flowing water courses.

Currently, the fish-farming industry consumes 68% of the produced fish meal and more than 88% of the fish oil production.

There is, worldwide, therefore a pronounced scarcity of fish meal and fish oil since the demand increases rapidly and the production of fish meal declines steadily due to overfishing. This market situation, therefore, resulted in pronounced price increases on the world's fish meal and fish oil markets.

The National Organic Standards Board (NOSB) has decided that, after a transitional phase of 12 years, no fish meal and also no fish oil may be fed any longer in certified organic fish farms.

It will, therefore, in the future no longer be possible for commercial, ecological and also ethical reasons to feed fish and other aquatic animals with fish meal and fish oil or other animal-derived feedstuffs!

Alternative, vegetarian feed options for fish must therefore be developed!

It is an object of the invention to describe a novel, innovative, inexpensive, efficient, environmentally-friendly, organic and residue-free feeding method which allows the fish farmer to produce purely vegetarian feed rations using suitable natural and organic feed additives in sterile environments, without foreign contamination and pathogenic microorganisms and without adverse effects on flavor and without shelf-life- and quality-reducing substances in such a way that they optimally agree with the requirements of fish and aquatic animals in terms of protein content, fat content, carbohydrate content, protein composition, fatty acid composition and mineral and vitamin content and thus result in a healthy development with the highest possible daily weight gains.

The invention is based on the combined use of *Spirulina* and *Chlorella* algae produced by electrolyzed disinfecting water generated with diamond electrodes, using sodium thiosulfate for neutralizing chlorine and guar powder and oligofructans as additives, for the preparation of a balanced purely vegetarian, ecological complete feed which does not cause diarrhea and simultaneously results in an economically advantageous daily weight gain in fish and does not lead to organoleptically perceived disadvantageous sensory effects on the fish meat quality.

Electrolysis of Water

The electrolysis of water consists of two individual reactions which proceed at the two electrodes. The electrodes are immersed in water, whose conductivity is improved by the addition of a small amount of sodium chloride and or plant-physiological mineral nutrients, in which case chlorine is obtained instead of oxygen.

Positively charged hydronium ions ($H_3O+$) migrate in the electrical field towards the negatively charged electrode (cathode), where each of them accepts one electron. This gives rise to hydrogen atoms, which combine with a further H atom, generated by reduction, to give a hydrogen molecule. What remains are water molecules.

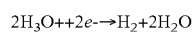

$$2H_3O+ + 2e- \rightarrow H_2 + 2H_2O$$

The gaseous hydrogen which has been separated off ascends at the cathode.

The negatively charged hydroxide ions migrate to the positively charged electrode (anode). Each hydroxide ion donates an electron to the positive terminal, giving rise to oxygen atoms which combine to give oxygen molecules, or, if NaCl is added, to give chlorine molecules. The remaining H+ ions are neutralized immediately by hydroxide ions to give water molecules.

$$4OH- \rightarrow O_2 + 2H_2O + 4e-$$

Again, the oxygen which is separated off ascends at the anode as a colorless gas. The overall reaction equation of the electrolysis of water reads:

$$4H_3O+ + 4OH- \rightarrow 2H_2 + O_2 + 6H_2O$$

The hydronium and hydroxide ions on the left-hand side are the result of water's autoprotolysis:

$$8H_2O \rightarrow 4H_3O+ + 4OH-$$

The equation of the electrolysis can therefore also be written as:

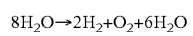

$$8H_2O \rightarrow 2H_2 + O_2 + 6H_2O$$

or, after reducing the water:

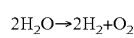

$$2H_2O \rightarrow 2H_2 + O_2$$

Hydroxide Ion:

The hydroxide ion is a negatively charged ion generated when bases react with water. Its chemical formula is OH—.

A general base B reacts with water following the scheme hereinbelow:

The pH of the resulting solution can be determined with reference to the hydroxide ion concentration. To this end, what is known as the pOH is calculated first of all and from this the pH:

$$pH = k - pOH$$

There is in each case one k for each temperature.

Under standard conditions, k=−14.

Hydroxide ions also occur in pure water at 20° C. at a concentration of $10^{-7}$ mol·l-1.

Electrolytically Generated Oxidative Water (EOW)

Electrolytically oxidative water (EOW) or chemically active water destroys microorganisms such as viruses, bacteria, fungi, yeasts and single-celled organisms by oxidative free radicals not only chemically, but mainly physically.

At the same time, organic material (fish feces) are oxidized by the electrolysis to give $CO_2$ and $H_2O$.

Owing to its high oxidative reduction potential (ORP), "active water" damages the cell wall membranes of pathogens.

The pathogen is compromised, which leads to an osmotic or hydrogenic overload in the interior of the cell.

The damaged cell membranes permit an increased water transfer between the cell membranes, which leads to hydrogenic flooding of the cells, and these are filled more rapidly than the cells can discharge the water.

This fact leads to bursting of the cells, or, respectively, to the cell's death as the result of a pressure explosion within a few seconds.

Since this is a physical destruction principle, it demonstrably results in no resistances of the pathogens.

Example of an electrolysis using a zinc iodide solution (electrode material arbitrary):

If two metal plates (electrodes) are each connected to a cable and a device which generates direct current, e.g. a battery or a rectifier, and if these plates are transferred into a glass beaker comprising an aqueous solution (ions arbitrary) and if a voltage is then applied, then at the two metal plates a substance forms, the ions of which are present in the solution.

The voltage source brings about an electron deficit in the electrode connected to the positive terminal (anode) and an electron excess in the other electrode connected to the negative terminal (cathode). The aqueous solution between the cathode and the anode comprises electrolytes, which are positively or negatively charged ions. The positively charged cations in an electrolysis cell migrate toward the negatively charged cathode as the result of applying a voltage (attraction of opposite charges). At the cathode, they take up one or more electrons and are reduced thereby.

At the anode, the opposite process proceeds. There, the negatively charged anions release electrons, in other words they are oxidized. The number of electrons consumed by the reduction at the cathode corresponds to the electrons taken up by the anode. During the electrolysis of aqueous sodium chloride solution, the same volumes of hydrogen gas and chloride gas are formed. In the electrolysis of water, twice as much hydrogen gas as oxygen gas is generated since the two positively charged protons of a water molecule migrate toward the cathode, where each of them must take up one electron for hydrogen to be formed, whereas the doubly negatively charged oxygen anion must, at the anode, release two electrons at the same time in order to join to form the oxygen molecule.

The minimum voltage to be applied for electrolysis to occur is called the deposition potential; in the electrolysis of water or aqueous salt solutions, it is also referred to as the decomposition potential. This potential (or a higher potential) must be applied for the electrolysis to proceed in the first place. For any substance, for any conversion of ions into molecules comprising two or more atoms, the decomposition potential, the deposition potential, can be determined on the basis of the redox potential. The redox potential also forms the basis for much other important information for electrolysis, for example for the electrolytic decomposition of metal electrodes in acid or for reducing the decomposition potential by modifying pHs.

For example, it is possible to calculate from the redox potential that the formation of oxygen at the anode during the electrolysis of water in basic solution (decomposition potential: 0.401 V) proceeds at lower potential than in acidic solution (decomposition potential: 1.23 V) or neutral (decomposition potential: 0.815 V), whereas, at the cathode, hydrogen forms more readily under acidic conditions than under neutral or basic conditions).

If a plurality of reducible cations are present in an electrolyte solution, then in accordance with the redox potential series the cations which are reduced first at the cathode are those which have in the redox potential series (electrochemical series) a more positive (less negative) potential, which therefore come closest to the 0 potential of the proton-hydrogen electrode potential. During the electrolysis of an aqueous sodium chloride solution, usually hydrogen forms at the cathode and not sodium. Also in the case of the presence of a plurality of anion types which can be oxidized, those which come first are those which in the redox potential series are as close as possible to the potential zero point, that is to say have a less positive redox potential. Usually, therefore, oxygen and not chlorine is formed at the anode during the electrolysis of aqueous NaCl. After exceeding the decomposition potential, with an increase in potential, the current strength also increases proportionally. According to Faraday, the weight of an electrolytically formed substance is proportional to the amount of current flowing (current strength multiplied by time). For the formation of 1 g of hydrogen (approximately 11.2 liters, in the formation of one hydrogen molecule, two electrons are required) from aqueous solution, an amount of current of 96485 C (As)=1 Faraday is required. At a current strength of 1 A between the electrodes, the formation of 11.2 liters of hydrogen will, therefore, take 26 hours and 48 minutes.

Besides the redox potential, the overpotential is also of importance. Owing to kinetic inhibitions at electrodes, a significantly higher potential is frequently required than is calculated from the redox potentials. Depending on the type of the electrode material, the overpotential effects may also change the redox potential series, so that other ions are oxidized or reduced than would have been expected on the basis of the redox potential. Shortly after switching off an electrolysis, a current shift into the other direction can be determined with an ammeter. During this short phase, the reverse process of the electrolysis starts, which is the formation of a galvanic cell. In this case current is not consumed for the reaction, but current is briefly generated; this principle is used in fuel cells.

When by means of electrolysis a separation of individual molecules or bonds is forced, a galvanic element acts at the same time, the potential of which counteracts the electrolysis. This potential is also referred to as the polarization potential.

Electrodes

There are very few anode electrodes which remain inert during electrolysis—that is which do not go into solution at all. Carbon, or diamond, respectively, are materials which do not dissolve at all during an electrolysis. There are also metals which, despite a strongly negative redox potential, do not dissolve. This is referred to as "passivity". An iron anode which has been treated with concentrated nitric acid does not dissolve, nor do any iron(II) or (III) cations pass into solution; it has "passivity".

Inhibition phenomena at the anode which during oxygen formation lead to an overpotential are observed in diamond electrodes (overpotential: 3-4 V). With those, chlorine instead of oxygen is formed during the electrolysis of an aqueous sodium chloride solution. Due to this large electrical overpotential of 3-4 volt, therefore, it is possible to generate, using diamond electrodes, approximately 15 different oxidative radicals such as, for example, hypochlorite ClO— and hypochloric acid HClO, but also $H_2O_2$, ozone $O_3$ and other mineral peroxides which are excellent oxidants and have an outstanding biocidal activity. When all the free radicals in an oxidation (sterilization) have been consumed, the water solution reconstitutes to give water, minerals and residues of NaCl salt.

Electrolytes and Oxidative Radicals in the Electrolysis Water

| Sodium chloride | NaCl | 83.000 mg | 83.000 ppm |
|---|---|---|---|
| Hypochloric acid | HClO+ | | |
| Hypochlorite | ClO– | 5.000 mg | 5.000 ppm |
| Ozone | $O_3$ | 0.0250 mg | 0.0250 ppm |
| Hydrogen peroxide | $H_2O_2$ | 0.0100 mg | 0.0100 ppm |
| Total electrolytes and oxidative radical | | 88.035 mg | 88.035 ppm |

Culture Water for the Production of Algae Treated with Electrolyzed Water

From 0.5 to 10% of ELECTROLYZED water (100 ppm free chlorine as standard) are admixed to the CULTURE WATER for SPIRULINA ALGAE; this controls undesired ALGAE and BACTERIA in the CULTURE WATER and oxidizes organic substances so as to clarify the culture water.

After the treatment of the culture water for the production of *Spirulina* and *Chlorella*, the water is provided with sodium thiosulfate before being recirculated into the culture tanks. The mixing ratio here is 5 mol of sodium thiosulfate to 8 mol of sodium hypochlorite (NaOCl)

*Spirulina* Algae

*Spirulina* is a genus of the Cyanobacteria (previously referred to as "blue-green algae"). In some cases, 35 species are distinguished (for example *Spirulina platensis; Spirulina fusiformis; Spirulina maxima*), but it is unclear whether these 35 species might indeed all belong to the same species since *Spirulina* changes its morphology as a function of the nutrient content a pH of the water.

The bacterium forms multi-celled, helical filaments. The cylindrical cells have a diameter of approximately 1 to 5 μm and a length (height) of approximately 1 to 3 μm. They are arranged one after the other in long, right-handed or left-handed helical filaments with a length of 0.5 mm or more and a helix diameter of 5 to 40 μm. The longitudinal growth of the filaments entails cell division; multiplication takes place as a result of the filaments disintegrating.

*Spirulina* is oxygen-photosynthetic and only comprises chlorophyll a, which also occurs in plants. Since *Spirulina* belongs to the prokaryotes, the chlorophyll is not located in organized cell structures, the chloroplasts, as is the case in plants, which are eukaryotes, but it is located in membranes which are distributed across almost the entire cell. Owing to further pigments, which lie atop the green chlorophyll pigment, *Spirulina* has a bluish-green hue.

The *Spirulina* filaments, like other filamentous Cyanobacteria, form blankets. Due to the alkalization as the result of the consumption of carbon dioxide, calcium carbonate may be deposited therein. It is assumed that what are known as stromatoliths are formed in this manner and have indeed been formed in earlier geological periods. The oldest known stromatoliths occur in rock strata which have been formed over three billion years ago in the precambric. This allows the conclusion that oxygen-photosynthetic, carbon-dioxide-assimilating microorganisms, possibly Cyanobacteria, have contributed to accumulate oxygen ($O_2$) in Earth's carbon-dioxide-rich original atmosphere, reducing its carbon dioxide content and thus imparting it its current composition.

Occurrence

*Spirulina* occurs in strongly alkaline salt lakes (between pH 9 and 11); it populates shallow subtropical to tropical water courses with high salt contents, especially in Central America, South-East Asia, Africa and Australia. It has been used as a foodstuff by the people inhabiting the shores of these water courses since the days of old, for example by the Kanembu on Lake Chad, Africa, in the form of "dihe" and on Lake Texcoco, Mexico (as "tecuitatl" by the Aztecs). Even nowadays, a reminder of the latter is the soda concentration spiral in the valley of Mexico.

Cultivation and Constituents

*Spirulina* biomass is currently produced in aquacultures at a water temperature of up to 35 degrees Celsius. To harvest the product, the water together with the microorganisms is pumped across a filter or a centrifuge, and the sludge thus obtained is subsequently dried using hot air. *Spirulina* is also commercially available by the name of "microalgae". A problem is the potential contamination with microcystines as the result of algae (some of which are toxic) if the bacterium is not grown in separate, sealed tanks but harvested from open lakes. No microcystines have found as yet in *Spirulina* cultures.

Depending on their origin, the dried green-colored algae differ in respect of their composition:
  proteins 55-67%
  carbohydrates 10-19%
  fats 7-15%
  minerals 5-9%

The proteins comprise all the essential amino acids. Also present are β-carotene—a vitamin A precursor—, vitamins B and E and, at high concentrations, calcium, iron and magnesium. As opposed to marine algae, *Spirulina*, which is a fresh water Cyanobacterium, does not comprise any iodine.

Use

Every year, approximately 3000 tonnes of *Spirulina platensis* crude matter from commercial production is sold as a food supplement. In Germany, *Spirulina* and the fresh water alga *Chlorella* is obtainable as a food supplement in the form of a powder or tablets and is processed in (organic) foodstuffs as a nutritious ingredient (pasta, fruit bars, beverage powders and the like). *Spirulina* is also a component of many fish feeds and some cat foods. Other uses are in biotechnology and biotechnics, where *Spirulina* is used, inter alia, as a biocatalyst in fermentation processes and for producing energy.

Use as Food Supplements

What is emphasized in *Spirulina* products as food additives is their protein content and vitamin $B_{12}$ content. However, the dose taken up via food additives (approximately 2-3.5 g) is so low that the supplementary protein is, as a rule, hardly noticeable. "The samples' advertisements comprised information on the high protein, vitamin, minerals and trace element contents of this alga, or the food supplements prepared therefrom, respectively.

Vitamin $B_{12}$

Based on the analytically determined high total value, *Spirulina* comprises to approximately 80% an ineffective form of the vitamin ("Pseudovitamin B12", "Vitamin B12 analogs"), while approximately 20% are the form of the vitamin which can be utilized by humans. This ratio of utilizable vitamin and what are known as analogs are found in many foodstuffs, including animal-derived foodstuffs, and is therefore nothing specific to the microalga.

*Chlorella* Algae

*Chlorella* is a genus of fresh-water algae. They are widely distributed.

*Chlorella* species form individual spherical cells and are green in color due to Chlorophyll a and b. The cells are very small; their diameter only amounts to 2 to 10 μm.

The cell wall of this genus of algae is composed of a multilayer cellulose skeleton into which layers of polymeric hydrocarbon chains are intercalated. The cells comprise a single chloroplast and mitochondria distributed in the cytoplasm.

It appears that the alga reproduces exclusively asexually, in any case no gamete formation has been observed.

*Chlorella vulgaris* is a single-celled green alga. The cells have a diameter of approximately 4-10 μm and are spherical in shape. Vegetative multiplication takes place by the development of autospores. No sexual reproduction is known. *Chlorella vulgaris* occurs in standing and flowing water courses, both in fresh water and in brackish water, but can also be found on solid surfaces. It is cosmopolitan.

This species has been isolated by Martinus Willem Beijerinck in 1889 near Delft. It is deposited in official strain collections, such as the Deutschen Sammlung von Mikroorganismen [German collection of microorganisms] as a type species of the genus *Chlorella* and is maintained in these collections.

Besides *Chlorella lobophora* and *Chlorella sorokiniana*, it belongs to the genus *Chlorella* within the class Trebouxiophyceae. In the past, *Chlorella vulgaris* was combined with other species with a similar appearance under the name *Chlorella pyrenoidosa*. In 1992, however, it was possible to demonstrate that there is no such thing as a species "*Chlorella pyrenoidosa*" *Chlorella vulgaris* has been used for a long time as model organism in scientific research. The mechanism of photosynthesis was elucidated on this alga.

The economic importance of *Chlorella vulgaris* is increasing. This microalga can be cultured in large amounts and is employed as food additive, as a raw material for the cosmetics industry and as larval feed in aquaculture. The largest microalgae farm in Europe, which specializes in culturing *Chlorella vulgaris*, is in Germany (Klotze in der Altmark).

Work on the cultivation of microalgae such as *Chlorella vulgaris* started in the Fifties of the previous century. Work focused on the question of how to provide the growing global population with sufficient protein in the future. The dried biomass of *Chlorella vulgaris* comprises approximately 50 percent protein, and the yield per hectare, up to 120 tonnes/ha, is well above that of traditional farming (for example wheat: approximately 7 tonnes/ha).

In the meantime, this alga has also attracted interest as a source for certain polyunsaturated fatty acids (for example alpha-linolenic acid) and carotenoids (for example lutein).

Sodium Thiosulfate:

Sodium thiosulfate is the stable sodium salt of thiosulfuric acid, which is unstable in the free state.

| Structural formula |
|---|
| 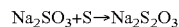 |

| General information | |
|---|---|
| Name | Sodium thiosulfate |
| Other names | Sodium hyposulfite (obsolete) |
| Empirical formula | $Na_2S_2O_3$ |
| CAS number | 7772-98-7 (anhydrous) |
| | 10102-17-7 (pentahydrate) |
| ATC code | V03AB06 |
| Brief description | Colorless, odorless crystals with a salty-bitter taste[1] |

| Properties | |
|---|---|
| Molar mass | 158.11 g · mol$^{-1}$ (anhydrous) |
| | 248.18 g · mol$^{-1}$ (pentahydrate) |
| State of aggregation | Solid |
| Density | 1.67 g · cm$^{-3}$ (20° C.)[2] |
| Melting point | 45-50° C. (pentahydrate)[1] |
| Boiling point | Decomposition from 300° C.[2] |
| Solubility | Readily soluble in water (701 g · l$^{-1}$ at 20° C.)[2] |

| Safety precautions |
|---|
| EU labeling of hazardous chemicals[2] |
| No risk symbols |

| R and S phrases | R: no R phrases |
|---|---|
| | S: no S phrases |

Preparation and Synthesis

Sodium thiosulfate is prepared by stirring sulfur into boiling sodium sulfite solution:

$Na_2SO_3+S \rightarrow Na_2S_2O_3$

Properties

Sodium Thiosulfate:

Sodium thiosulfate forms colorless crystals which crystallize with 5 mol of water of crystallization and are readily soluble in water; upon dissolution, the liquid cools greatly since the enthalpy of hydration is less than the lattice energy, and the missing amount of heat is withdrawn from the system. This so-called pentahydrate, $Na_2S_2O_3.5H_2O$, is also known as photographic fixer since it is used in the development of films for stabilizing the image. By the name of antichlor, it is used after the bleaching of paper and textile fibers for removing the excess of chlorine.

The pentahydrate crystals have a melting point of 48.5° C.; the melt may be supercooled and, upon solidification triggered by a seed crystal, gives off a great amount of heat of crystallization. When acid is added to an aqueous sodium thiosulfate solution, sulfur will precipitate after a short time in the form of a yellowish turbidity. This is because the unstable thiosulfuric acid ($H_2S_2O_3$) which has been liberated decomposes rapidly to give sulfur and sulfur dioxide:

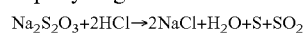

The water-insoluble silver halides are dissolved by a fixer solution. The developed film is made light-insensitive by the formation of the water-soluble sodium dithiosulfatoargentate (I) complex:

$$2Na_2S_2O_3 + AgCl \rightarrow Na_3[Ag(S_2O_3)_2] + NaCl$$

Sodium thiosulfate is a reducing agent and therefore reacts readily with the oxidant potassium permanganate.

Use

Sodium thiosulfate is used as an antichlor in bleaching processes by reducing chlorine to chloride, with the formation of hydrogen sulfate and hydrochloric acid:

$$S_2O_3^{2-} + 4Cl_2 + 13H_2O \rightarrow 2HSO_4^- + 8H_3O^+ + 8Cl^-$$

In chemistry, it is used for determining the iodine number; in iodometry, thiosulfate is oxidized to tetrathionate:

$$2S_2O_3^{2-} + I_2 \rightarrow S_4O_6^{2-} + 2I^-.$$

Guar Gum

The cluster bean (*Cyamopsis tetragonolobus*), also referred to as guar, is a useful plant from the Fabaceae or Leguminosae family, subfamily Faboideae. It is closely related to a series of other crops referred to as "beans".

| Structural formula |
|---|
| 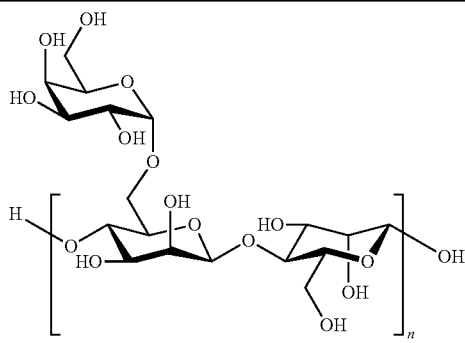 |

| General information | |
|---|---|
| Name | Guaran |
| Other names | Guar gum |
| | Guar |
| | Guar meal |
| | E412 |
| CAS number | 9000-30-0 |
| Polymer type | Polysaccharide |
| Monomer | |
| Monomer | 1,4-β-D-mannose, galactose |
| Empirical formula | $C_{18}H_{29}O_{15}$ |
| Molar mass | 485.4181 g/mol |
| Properties | |
| Safety precautions | |
| Labeling of hazardous chemicals[1] | |
| | No risk symbols |
| R and S phrases | R: no R phrases |
| | S: no S phrases |

Description

Cluster beans grow up to two meters in height. The plant develops pods approximately 10 cm in length which contain oval seeds approximately 5 mm in size.

Distribution

Cluster beans probably originated in India, or else perhaps in Central Africa. The main production areas are in India and Pakistan. The plant might be a descendent of the wild plant *Cyamopsis senegalensis*.

Utilization

The leaves and fresh pods are eaten as vegetables, the entire plant is used as green fodder. The dried seeds are eaten, but also processed to give Guar gum (which is similar to gum arabic). An important constituent of the plant is the polysaccharide guaran, which is used for the preparation of guar gum (E 412; also referred to as guar, guar meal). To this end, the outer layers and the germ are removed from the seeds, which are subsequently ground.

Guaran is a plant mucilage. The chemical compound from the group of the polysaccharides is the main constituent of guar gum (E 412).

Chemical Structure

Guaran is composed of β-D-mannopyranose units which are linked in a chain-like fashion via 1,4-glycosidic bonds. In addition, every other mannopyranose unit has α-D-galactopyranosyl residues attached to it via a 1,6-bond.

Preparation

Guar gum is obtained from the seeds of cluster beans (scientific name: *Cyamopsis tetragonoloba*) by removing the outer layers and the germ and subsequently grinding the remaining parts. Guar gum contains, besides guaran, 10 to 15% of water, 5% of protein, 2.5% of crude fiber and less than 1% ash.

A functionally similar food additive from the galactomannan class can be obtained from carob trees.

Use

Guaran is used in the pharmaceuticals, cosmetics, paper and food industries and also as a tobacco additive. For example, it is used as emulsifier (for example in ice cream) or natural thickener, and is also more frequently a component of hair gel.

In the EU, it is approved as food additive (number E 412) for foodstuffs in general (including "organic" products).

It forms highly load-dependent highly-viscous solutions.

Orthofructans

Oligofructans (fructooligosaccharides), like inulin, are composed of a plurality of (in this case up to 10) fructose units. They are added to, for example, yogurt to act as a prebiotic and stimulate the bacteria in the large intestine. Since they have between 30 and 50% of sugar's sweetening power, they are also employed as sugar substitutes. If foodstuffs do not contain any other sugars (mono- or disaccharides), they may, despite the sweet taste, still be advertized as "sugar-free". If they still contain mono- or disaccharides (for example from fruit), they may be labeled as "without added sugar". Oligofructose, for example, is composed of 3-10 β-glycosidically bonded units.

Oligofructans belong to the class of the polysaccharides.

Polysaccharides (also referred to as glycans/polyosis) are carbohydrates which are connected from a large number (at least 10) of monosaccharides (monosugars) via a glycosidic bond. They are biopolymers with an unknown number of monosaccharide units or a statistic molecule size distribution. Examples of polysaccharides are glycogen, starch (amylose and amylopectin), pectins, chitin, callose and cellulose. Polysaccharides play an important role as mucilages, reserves and nutrients for plants, animals and, of course, humans.

Some polysaccharides have the general formula:

$$-[C_x(H_2O)_y]_n-$$

where x is in most cases 5 to 6 and y in most cases x-1

The polysaccharides are divided depending on the nature of the individual units of the molecule into homoglycans (only one type of monosugar) and heteroglycans (two or more different chain units).

Frequently, polysaccharides are involved in the structure of the external coat of certain microorganisms (example: *Streptococcus pneumoniae*). Their composition, which may differ within one group of organisms, determines the surface structure and, therefore, the respective serotype.

Polysaccharides can be produced artificially using, inter alia, the Koenigs-Knorr method.

SOLUTION TO THE PROBLEM

The solution to the problem is defined by the features of the independent patent claims. According to the invention describes the novel method for the preparation of a fully vegetarian feed for growing and fattening carnivorous fish, shrimp and other aquatic animals, without the use of animal by-products and fish meal in the feed ration, on a purely vegetarian base using *Spirulina* and *Chlorella* algae which are produced by means of electrolyzed water with addition of chlorine-neutralizing sodium thiosulfate and which, as feed pellets which are treated with guar and oligofructans, can be administered as a complete feed.

According to the invention, the process additionally describes the technical design and application in respect of the combination of specific feed additives in an exclusively vegetarian feed ration for, preferably, carnivorous fish, shrimp and other aquatic animals, i.e. *Spirulina* and *Chlorella Vulgaris* algae which have been grown under sterile conditions using electrolyzed water, with the addition of sodium thiosulfate in a ratio 8 to 5 mol of sodium hypochlorite as neutralization medium for chlorine compounds in the production water, and with the addition of 0.3% guar gum powder and 1-2% orthofructans as feed additives for preventing diarrhea and for improving the digestion and nutrient absorption in the gut, The invention forms an integrated system in which the technical components for disinfecting the algal culture water in the culture tanks are integrated—by means of the electrolytic preparation of oxidative free radicals and nutrients in the water, employing the relevant application technology by means of vortex premixing technique and chemical chlorine neutralization technique by means of sodium thiosulfate for the chlorine-contamination-free and sterile and odor-neutral production and growing of *Spirulina* and *Chlorella* algae.

In this context, the focus of the innovation is not only the technical combination of the novel algal culture method with the sterilizing effect of electrolyzed water, but also the combination of the electrolyzed and oxidized nutrient components which are digested physiologically electrochemically by the electrolysis such that they can be absorbed immediately by the algae without enzymatic rearrangement and catalyze, with the aid of intense sunlight and heat, an accelerated phytogenic photosynthesis, leading to a 50% more rapid algal growth.

Moreover, the probiotic additives in the exclusively vegetarian algal feed ration i.e. guar gum powder and orthofructans and the metering in of up to 10% of electrolyzed water to the finished pelleted vegetarian fish feed are innovative ingredients in a vegetarian fish feed ration.

The optimum concentrations of oxidative sterilizing radicals in the electrolyzed water or in the algal culture water and the concentrations of the mineral nutrients were determined in intensive experiments, and the specific parameters for the metering in of guar gum and orthofructans in the vegetarian fish feed were determined.

According to the inventor's knowledge, the feeding technique described herein and the feeding method on an exclusively vegetarian basis for the residue-free, clean and diarrhea-free production of carnivorous fish by the combined technologies and applications and specific probiotic additives employed is not known and globally not yet employed in this form, which plausibly supports the patentability and innovative invention.

PRACTICE OF THE INVENTION

The invention will now be discussed with reference to a production plant for a vegetarian feed ration for carnivorous fish using the described process and the application technologies employed.

A production plant for a culture method for *Spirulina* and *Chlorella* algae in the sterile algal culture tank by means of addition of with neutral electrolyzed, sterilizing water and phyto-suitable nutrients and additional neutralization of the hypochloride hypochlorite ions is preferably composed of the following technical units:

1. Disinfection tank with 10-mesh inlet filter made of corrosion-resistant plastic, with a sufficiently large volume, for a first general disinfection of the algal culture water with additional support by a sonicator, preferably designed as a pipe resonator with a frequency of from 20 to 40 kHz, adjustable. The filtered algal culture water is electrolyzed by an electrolysis unit equipped with diamond electrodes with a preferred energy input of 15 A and 100 V. ANNEX 1 A 2. Electrolysis generator with preferably one or more single-chamber electrolysis cells connected in parallel, with boron-doped diamond electrodes, pump made of corrosion-free material with a pumping capacity of preferably 6000 to 10 000 liters per hour and a pressure of 4 bar, 50-mesh filter, flux meter for up to and above 10 000 liters per hour, pressure regulator with preferably 2 stopcocks and 2 pressure gauges, electrical water flux sensor, electronic control unit with time-controlled automatic electrode polarity reversal, redox-meter, mSiemens/cm-conductivity meter and water thermometer sensor. ANNEX 1 B 3. Neutralization tank for neutralizing the hypochlorite ions by means of sodium thiosulfate with vortex mixer and metering injector pump. Mixing of the algal culture water preferably with 5 mol of sodium thiosulfate to 8 mol of sodium hypochlorite. ANNEX C 4. Nutrient-mixing and tank unit with metering injection pump into the neutralization tank, for providing nutrients to the algal culture water. ANNEX 1 D 5. Water lock with centrifugal filter unit for the algae harvest. ANNEX 1 E 6. Filter press with belt drying unit or solar drying unit. ANNEX 1 F 7. Algae powder mill. ANNEX 1 G 8. Drum mixer for admixing guar gum powder and oligofructan powder. ANNEX 1 H 9. Automatic pelleting machine with electrolyzed water drum dryer. ANNEX 1I 10. Bagging or packaging unit. ANNEX 1 K 11. Bag palletizer for packaged fully vegetarian fish feed algae. ANNEX 1 L 12. Electronic production monitoring unit. ANNEX 1 M

I claim:

1. A method for preparing a fully vegetarian feed for growing and fattening carnivorous fish and shrimp, said method comprising:
   a) producing a quantity of electrolyzed water;
   b) forming a first mixture comprising either,
      (i) a quantity of *Spirulina* algae and *Chlorella* algae contained in the electrolyzed water; or
      (ii) an admixture of the electrolyzed water with an aqueous culture medium, said admixture containing a quantity of the *Spirulina* algae and the *Chlorella* algae,
   wherein the electrolyzed water is provided in said first mixture in an amount sufficient to at least partially reduce undesired algae and bacteria therein, and also to oxidize organic substances contained in said first mixture;
   c) adding to said first mixture a quantity of sodium thiosulfate sufficient to at least partially neutralize chlorine compounds in the first mixture;
   d) culturing a quantity of the algae in said first mixture;
   e) removing at least a portion of the cultured algae from the first mixture;
   f) drying the removed algae;
   g) admixing the dried algae with a quantity of a second mixture formed of guar gum powder, an oligofructan powder and a quantity of sterilizing electrolyzed water; and
   h) producing a quantity of pellets of said fully vegetarian feed from said admixture.

2. The method according to claim 1, wherein said second mixture contains from 0.5 to 10% by weight of the sterilizing electrolyzed water.

3. The method according to claim 1, wherein the sodium thiosulfate is added into the first mixture in a mixing ratio of 5 mol sodium thiosulfate to 8 mol sodium hypochlorite.

4. The method according to claim 1, wherein the guar gum powder is added to the dried algae in an amount of about 0.3 wt-% of the dry weight of said dried algae.

5. The method according to claim 1, wherein the oligofructan powder is added to the dried algae in an amount of about 1-2 wt-% of the dry weight of said dried algae.

6. A fully vegetarian feed for growing and fattening carnivorous fish and shrimp without the inclusion of any animal by-products and fish meal, said feed produced by the method of claim 1.

7. A method for preparing a fully vegetarian feed for growing and fattening carnivorous fish and shrimp, said method comprising:
   a) producing a quantity of electrolyzed water;
   b) forming a first mixture comprising either,
      (iii) a quantity of *Spirulina* algae and *Chlorella* algae contained in the electrolyzed water; or
      (iv) an admixture of the electrolyzed water with an aqueous culture medium, said admixture containing a quantity of the *Spirulina* algae and the *Chlorella* algae,
   wherein the electrolyzed water is provided in said first mixture in an amount sufficient to at least partially reduce undesired algae and bacteria therein, and also to oxidize organic substances contained in said first mixture;
   c) adding sodium thiosulfate to said first mixture to at least partially neutralize chlorine compounds contained in the first mixture, wherein the sodium thiosulfate is added into the first mixture in a mixing ratio of 5 mol sodium thiosulfate to 8 mol sodium hypochlorite;
   d) culturing a quantity of the algae in the first mixture;
   e) removing at least a portion of the cultured algae from the first mixture;
   f) drying the removed algae portion;
   g) admixing the dried algae with a second mixture formed of about 0.3 wt-% of guar gum, about 1-2 wt-% of an oligofructan powder, and from 0.5 to 10 wt-% of sterilizing electrolyzed water; and
   h) producing a quantity of pellets of said fully vegetarian feed from the admixture.

8. A fully vegetarian feed for growing and fattening carnivorous fish and shrimp without the inclusion of any animal by-products and fish meal, said feed produced by the method of claim 7.

9. A fully vegetarian feed for growing and fattening carnivorous fish and shrimp, said feed comprising the following nutrient components, by weight of dry matter:
   a) 47.6% algal crude proteins;
   b) 17.2% algal fatty acids;
   c) 16.9% algal starch;
   d) 1.1% algal phosphorous;
   e) 0.3% guar gum powder;
   f) 2.0% oligofructans; and
   g) 14.9% minerals, oligoelements and vitamins.

10. An apparatus for preparing a fully vegetarian feed for growing and fattening carnivorous fish and shrimp, said feed prepared in the form of a plurality of feed pellets comprised of *Spirulina* and *Chlorella* algae cultured by cell proliferation in a culture medium comprising electrolyzed, nutrient-treated water containing a chlorine-neutralizing amount of sodium thiosulfate, in admixture with guar gum powder and oligofructan powder in a solution of sterilizing electrolysis water, said apparatus comprising:
    a) a disinfection tank for disinfecting algal culture water, wherein filtered algal culture water is electrolyzed by an electrolysis unit;
    b) an electrolysis generator for electrolyzing the filtered culture water;
    c) a neutralization tank for neutralizing hypochlorite ions in said algal culture water by addition thereto of sodium thiosulfate;
    d) a nutrient tank and mixing unit for providing nutrients to said algal culture water and mixing the nutrients with said water;
    e) a water lock comprising a filter unit for harvesting said algae;
    f) a filter press for drying the harvested algae;
    g) a powder mill for powdering the dried algae;
    h) a drum mixer for admixing guar gum powder and oligofructan powder with the powdered algae, said powders contained in a solution of sterilized electrolyzed water;
    i) an automatic pelleting unit for forming the admixture into a pellet form, said pelleting unit comprising an electrolyzed water drum dryer
    j) a bagging or packaging unit for collecting said pellets;
    k) a bag palletizer for palletizing packaged pellets of the fully vegetarian food; and
    l) an electronic production monitoring unit operatively associated with said apparatus for monitoring and controlling the apparatus.

11. The apparatus according to claim 10 wherein, in the disinfection tank the algal water is filtered through a 10-mesh inlet filter formed of a corrosion-resistant plastic.

12. The apparatus according to claim 10, wherein the disinfection tank further includes a sonicator.

13. The apparatus according to claim 12, wherein the sonicator is a pipe resonator having an adjustable frequency of from 20 to 40 kHz.

14. The apparatus according to claim 10, wherein the electrolysis generator comprises at least one single chamber electrolysis cell wherein, in case of >1 cell, the cells are connected in parallel, said generator further comprising, in each said cell, boron-doped diamond electrodes, a pump formed of corrosion-free material, a filter, a flux meter, a pressure regulator, an electrical water flux sensor, an electronic control unit, a redox meter, an mSiemens/cm conductivity meter and a water thermometer sensor.

15. The apparatus according to claim 10 wherein the neutralization tank comprises a metering injector pump and a vortex mixer for adding and mixing said thiosulfate with said algal culture water.

16. The apparatus according to claim 10, wherein the filter press comprises a belt drying unit or a solar drying unit.

* * * * *